(12) United States Patent
Kim (10) Patent No.: US 9,592,718 B2
(45) Date of Patent: Mar. 14, 2017

(54) INTEGRATED COOLING SYSTEM CONTROL METHOD

(71) Applicant: Hyundai Motor Company, Seoul (KR)

(72) Inventor: Jaeyeon Kim, Hwaseong-Si (KR)

(73) Assignee: Hyundai Motor Company, Seoul (KR)

( * ) Notice: Subject to any disclaimer, the term of this patent is extended or adjusted under 35 U.S.C. 154(b) by 296 days.

(21) Appl. No.: 14/554,953

(22) Filed: Nov. 26, 2014

(65) Prior Publication Data

US 2016/0068041 A1    Mar. 10, 2016

(30) Foreign Application Priority Data

Sep. 5, 2014  (KR) .......................... 10-2014-0119220

(51) Int. Cl.
*B60H 1/32* (2006.01)
*B60H 1/00* (2006.01)
(Continued)

(52) U.S. Cl.
CPC ..... *B60H 1/00735* (2013.01); *B60H 1/00885* (2013.01); *B60H 1/323* (2013.01);
(Continued)

(58) Field of Classification Search
CPC ............ B60H 1/00278; B60H 1/00385; B60H 1/00392; B60H 1/004; B60H 1/00885;
(Continued)

(56) References Cited

U.S. PATENT DOCUMENTS

2010/0000713 A1* 1/2010 Takahashi .......... B60H 1/00899
165/61
2011/0132017 A1* 6/2011 Kim .................... B60H 1/00278
62/259.2
(Continued)

FOREIGN PATENT DOCUMENTS

JP          2004-353554 A      12/2004
KR          10-0219321          6/1999
(Continued)

*Primary Examiner* — Jonathan Bradford
(74) *Attorney, Agent, or Firm* — Morgan, Lewis & Bockius LLP (57) ABSTRACT

A control method for an integrated cooling system may include determining whether an air conditioner is operated or not, and controlling operations of a water pump for electric devices and a cooling fan by the controller according to a predetermined first map when the air conditioner is not operated, detecting an air conditioner refrigerant pressure when the air conditioner is operated, determining whether the air conditioner refrigerant pressure is within a predetermined range or not, and controlling operations of the water pump for electric devices and the cooling fan according to a predetermined second map when the air conditioner refrigerant pressure is not within the predetermined range, and determining of cooling requirement of the condensers and controlling operations of the water pump for electric devices and the cooling fan according to the cooling requirement of the condensers when the air conditioner refrigerant pressure is within the predetermined range.

18 Claims, 3 Drawing Sheets

(51) Int. Cl.
   *F01P 3/00* (2006.01)
   *B60L 11/18* (2006.01)
(52) U.S. Cl.
   CPC .............. *B60H 1/3227* (2013.01); *F01P 3/00* (2013.01); *B60H 1/00278* (2013.01); *B60H 2001/00928* (2013.01); *B60H 2001/325* (2013.01); *B60H 2001/3251* (2013.01); *B60H 2001/3276* (2013.01); *B60H 2001/3277* (2013.01); *B60L 11/1874* (2013.01)
(58) Field of Classification Search
   CPC .......... B60H 1/323; B60H 2001/00307; B60H 2001/00928; B60H 2001/3248; B60H 2001/3251; B60H 2001/3252; B60H 2001/3254; B60H 2001/3277; B60L 11/1874
   See application file for complete search history.

(56) References Cited

U.S. PATENT DOCUMENTS

| | | | |
|---|---|---|---|
| 2011/0132030 A1* | 6/2011 | Kim | B60H 1/00885 62/507 |
| 2012/0137725 A1* | 6/2012 | Kim | B60H 1/00342 62/509 |
| 2013/0298583 A1* | 11/2013 | O'Donnell | H01M 6/5038 62/115 |

FOREIGN PATENT DOCUMENTS

| | | |
|---|---|---|
| KR | 10-2009-0004130 A | 1/2009 |
| KR | 10-2011-0046602 A | 5/2011 |
| KR | 10-2012-0018537 A | 3/2012 |
| KR | 10-1227223 | 1/2013 |
| KR | 10-2014-0032801 A | 3/2014 |

* cited by examiner

INTEGRATED COOLING SYSTEM CONTROL METHOD

CROSS-REFERENCE TO RELATED APPLICATION

The present application claims priority to Korean Patent Application No. 10-2014-0119220 filed Sep. 5, 2014, the entire contents of which is incorporated herein for all purposes by this reference.

BACKGROUND OF THE INVENTION

Field of the Invention

The present invention relates to an integrated cooling system control method. More particularly, the present invention relates to a control method for an integrated cooling system including a water-cooled condenser for an air conditioner equipped within a radiator for electric devices and an air-cooled condenser for an air conditioner which may reduce power consumption.

Description of Related Art

In general, air-conditioning apparatuses include an air-conditioning system for heating/cooling the interior of vehicles.

Those air-conditioning systems, which keep the interior of vehicles pleasant by maintaining the temperature of the interior at appropriate levels regardless of changes in external temperature, heat or cool the interior of vehicles, using a refrigerant that is discharged from a compressor and exchanges heat through an evaporator while circulating through a condenser, a receiver drier, an expansion valve, the evaporator, and the compressor.

That is, in the air-conditioning systems, a high-temperature and high-pressure refrigerant compressed by the compressor condenses through the condenser and reduces the temperature and humidity of an interior by evaporating through the evaporator after passing through the receiver drier and the expansion valve.

Recently, there is a need of developing an environmentally-friendly vehicle that can substantially replace the Internal Combustion Engine (ICE) vehicles, with an increasing concern on energy efficiency and the problem with environmental pollution and the environmentally-friendly vehicle generally falls into an electric vehicle driven by a fuel cell or electricity, which is the power source, and a hybrid vehicle driven by an engine and an electric battery.

In electric vehicles, a cooling system that cools the electric parts is provided as a specific closed circuit, in addition to the air-conditioning system, such that the cooling module that is disposed at the front part of the vehicles and supplies a refrigerant or cooling water to the systems is complicated.

Further, when a water-cooled condenser is applied to a vehicle, the circuit for separately supplying cooling water and a refrigerant is complicated and the maximum load conditions and the operation temperatures of the systems are different, such that when the cooling module is cooled in an air-cooled using a cooling fan and running air, the cooling performance of one of the systems is enough but the cooling performance of the other is not enough.

That is, since the air-conditioning system is provided as a closed circuit separate from other cooling systems, when a water-cooled condenser is used, the layout in the small engine room is complicated and the power consumption by the compressor, the cooling fan, and the water pump increases due to the difference in cooling performance according to driving conditions, such that the consumption of electricity increases and the travel distance decreases.

Further, since the maximum load conditions of the cooling system and the air-conditioning system are different, the system is difficult to be controlled in the optimum state, such that the cooling performance of the cooling system and the cooling performance of the air-conditioning system decrease.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a control method for an integrated cooling system including a water-cooled condenser for an air conditioner equipped within a radiator for electric devices and an air-cooled condenser for an air conditioner having advantages of reducing power consumption of a water pump for electric devices and a cooling fan.

According to various aspects of the present invention, a control method for an integrated cooling system including a water-cooled condenser for an air conditioner provided within a radiator for electric devices and an air-cooled condenser for an air conditioner may include determining, by a controller, whether the air conditioner is operated or not, and controlling operations of a water pump for electric devices and a cooling fan by the controller according to a predetermined first map when the air conditioner is not operated, detecting, by a coolant pressure sensor, an air conditioner refrigerant pressure when the air conditioner is operated, determining, by the controller, whether the air conditioner refrigerant pressure is within a predetermined range or not, and controlling, by the controller, operations of the water pump for electric devices and the cooling fan according to a predetermined second map when the air conditioner refrigerant pressure is not within the predetermined range, and determining, by the controller of cooling requirement of the condensers and controlling operations of the water pump for electric devices and the cooling fan according to the cooling requirement of the condenser when the air conditioner refrigerant pressure is within the predetermined range.

The controlling according to the predetermined first map may include determining whether cooling of an engine, a driving motor, an electric devices and an intercooler is required or not, controlling operations of the water pump for electric devices and the cooling fan to be off when the cooling of the engine, the driving motor, the electric devices and the intercooler is not required, operating first the water pump for electric devices and retarding operation of the cooling fan when the cooling of the engine is not required and the cooling of the motor, the electric devices and the intercooler is required, operating only the cooling fan when the cooling of the engine is required and the cooling of the motor, the electric devices and the intercooler is not required, and operating the water pump for electric devices and the cooling fan when the cooling of the engine, the motor, the electric devices and the intercooler is required.

The controlling according to the predetermined second map may include determining whether cooling of an engine, a driving motor, electric devices and an intercooler is required or not, controlling operations of the water pump for electric devices and the cooling fan to be off when the cooling of the engine, the driving motor, the electric devices and an intercooler is not required, operating only the water pump for electric devices when the cooling of the engine is not required and the cooling of the motor, the electric devices and the intercooler is required, operating only the cooling fan when the cooling of the engine is required and the cooling of the motor, the electric devices and the intercooler is not required, and operating the water pump for electric devices and the cooling fan when the cooling of the engine, the motor, the electric devices and the intercooler is required.

The control method may further include determining, by the controller, whether cooling of the condenser is required or not when the air conditioner refrigerant pressure is within the predetermined range, stopping operation or decelerating of the water pump for electric devices when the cooling of the condenser is not required, and operating first the water pump for electric devices and retarding operation of the cooling fan when the cooling of the condenser is required.

The water pump for electric devices and the cooling fan may be a water pump and a cooling fan of which operating speeds are controllable.

The water pump for electric devices may be an electric water pump of which speed is controlled by control signal of a Motor Control Unit (MCU).

An operating speed of the cooling fan may be controlled by control signal of a Hybrid Control Unit (HCU).

The controller may include a Full Auto Air Condition Temperature Controller FATC), an HCU and an MCU which are connected using Controller Area Network (CAN) communication with each other, wherein the FATC may output a required flowing rate signal of a coolant to the MCU, the MCU may determines a required flowing rate of a coolant required from the vehicle driving motor and the electric devices and may compare the required flowing rates, and the MCU may control the operation of the water pump according to the higher value of the compared required flowing rates.

The HCU may control an operation speed of the cooling fan, and the FATC may control an operation of a compressor according to controlling of the HCU.

According to various aspects of the present invention, a control method for an integrated cooling system including an engine cooling system having a radiator for an engine, a cooling fan and a water pump for the engine, a cooling system for electric devices having a vehicle driving motor, electric devices, an intercooler, a radiator for the electric devices and a water pump for electric devices, and an air conditioner cooling system having an expansion valve, an evaporator, a compressor, an air-cooled condenser and a water-cooled condenser provided within the radiator for the electric devices, the control method may include determining, by a controller, whether an air conditioner is operated or not, and controlling an operations of the water pump for the electric devices and the cooling fan by the controller according to a predetermined first map when the air conditioner is not operated, detecting, by a coolant pressure sensor, an air conditioner refrigerant pressure when the air conditioner is operated, determining, by the controller, whether the air conditioner refrigerant pressure is within a predetermined range or not, and controlling, by the controller, operations of the water pump for electric devices and the cooling fan according to a predetermined second map when the air conditioner refrigerant pressure is not within the predetermined range, and determining, by the controller of cooling requirement of the condensers and controlling operations of the water pump for electric devices and the cooling fan according to the cooling requirement of the condenser when the air conditioner refrigerant pressure is within the predetermined range.

The controlling according to the predetermined first map may include determining whether cooling of the engine, the driving motor, the electric devices and the intercooler is required or not, controlling operations of the water pump for electric devices and the cooling fan to be off when the cooling of the engine, the driving motor, the electric devices and the intercooler is not required, operating first the water pump for electric devices and retarding operation of the cooling fan when the cooling of the engine is not required and the cooling of the motor, the electric devices and the intercooler is required, operating only the cooling fan when the cooling of the engine is required and the cooling of the motor, the electric devices and the intercooler is not required, and operating the water pump for electric devices and the cooling fan when the cooling of the engine, the motor, the electric devices and the intercooler is required.

The controlling according to the predetermined second map may include determining whether cooling of an engine, a driving motor, electric devices and an intercooler is required or not, controlling operations of the water pump for electric devices and the cooling fan to be off when the cooling of the engine, the driving motor, the electric devices and an intercooler is not required, operating only the water pump for electric devices when the cooling of the engine is not required and the cooling of the motor, the electric devices and the intercooler is required, operating only the cooling fan when the cooling of the engine is required and the cooling of the motor, the electric devices and the intercooler is not required, and operating the water pump for electric devices and the cooling fan when the cooling of the engine, the motor, the electric devices and the intercooler is required.

The control method may further include determining, by the controller, whether cooling of the condenser is required or not when the air conditioner refrigerant pressure is within the predetermined range, stopping operation or decelerating of the water pump for electric devices when the cooling of the condenser is not required, and operating first the water pump for electric devices and retarding operation of the cooling fan when the cooling of the condenser is required.

The water pump for electric devices and the cooling fan may be a water pump and a cooling fan of which operating speeds are controllable.

The water pump for electric devices may be an electric water pump of which speed is controlled by control signal of an MCU.

An operating speed of the cooling fan may be controlled by control signal of a HCU.

The controller may include a FATC, an HCU and an MCU) which are connected using CAN communication each other, wherein the FATC may output a required flowing rate signal of a coolant of the air conditioner cooling system to the MCU, the MCU may determine a required flowing rate of a coolant of the cooling system for electric devices and may compare the required flowing rates, and the MCU may control the operation of the water pump according to the higher value of the compared required flowing rates.

The HCU may control an operation speed of the cooling fan, and the FATC may control an operation of a compressor according to controlling of the HCU.

As described above, according to the control method for the integrated cooling system of various embodiments of the present invention, it is possible to minimize power consumption for operating a cooling fan and a compressor so that fuel and battery consumption may be reduced.

Also, operating time of a water pump for electric devices and a cooling fan may be reduced, and pressure rising of refrigerant of an air conditioner may be prevented.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 is a block diagram showing an integrated cooling system of which an exemplary integrated cooling system control method according to the present invention is applied to.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
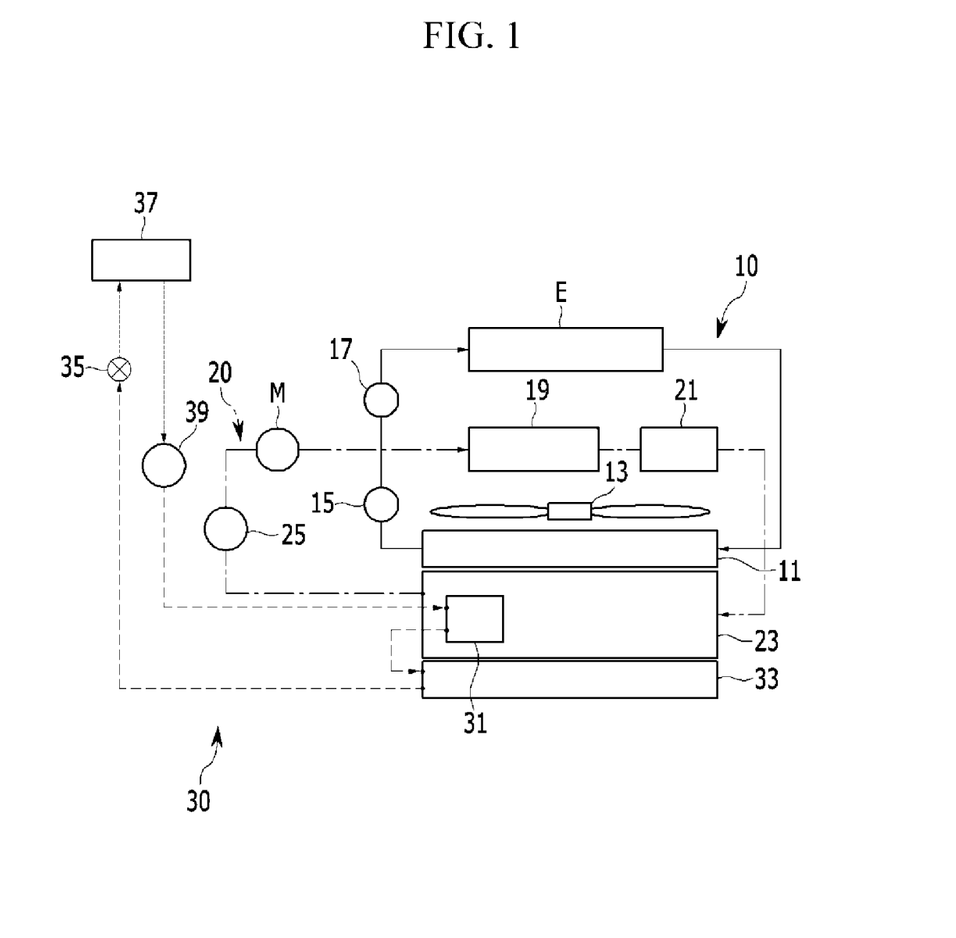
Figure 2:
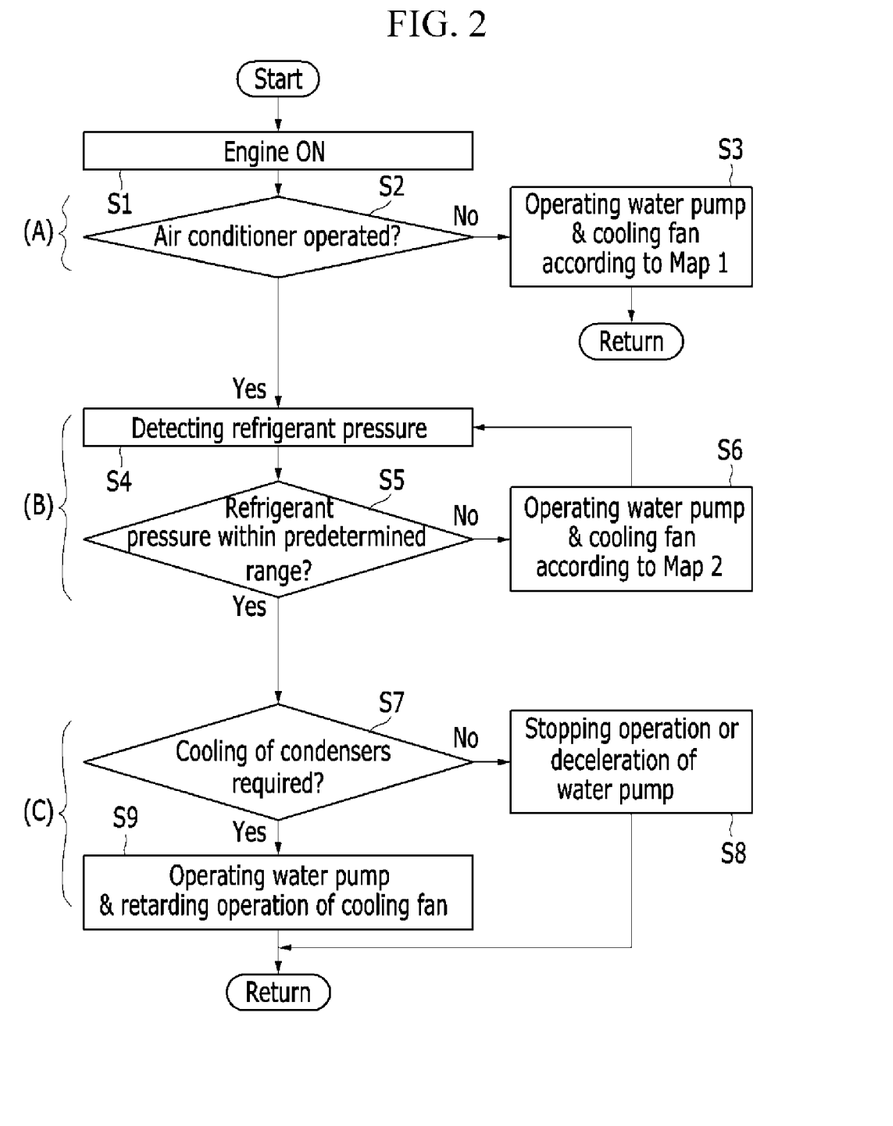
FIG. 2 is a flowchart illustrating an exemplary integrated cooling system control method according to the present invention.
Figure 3:
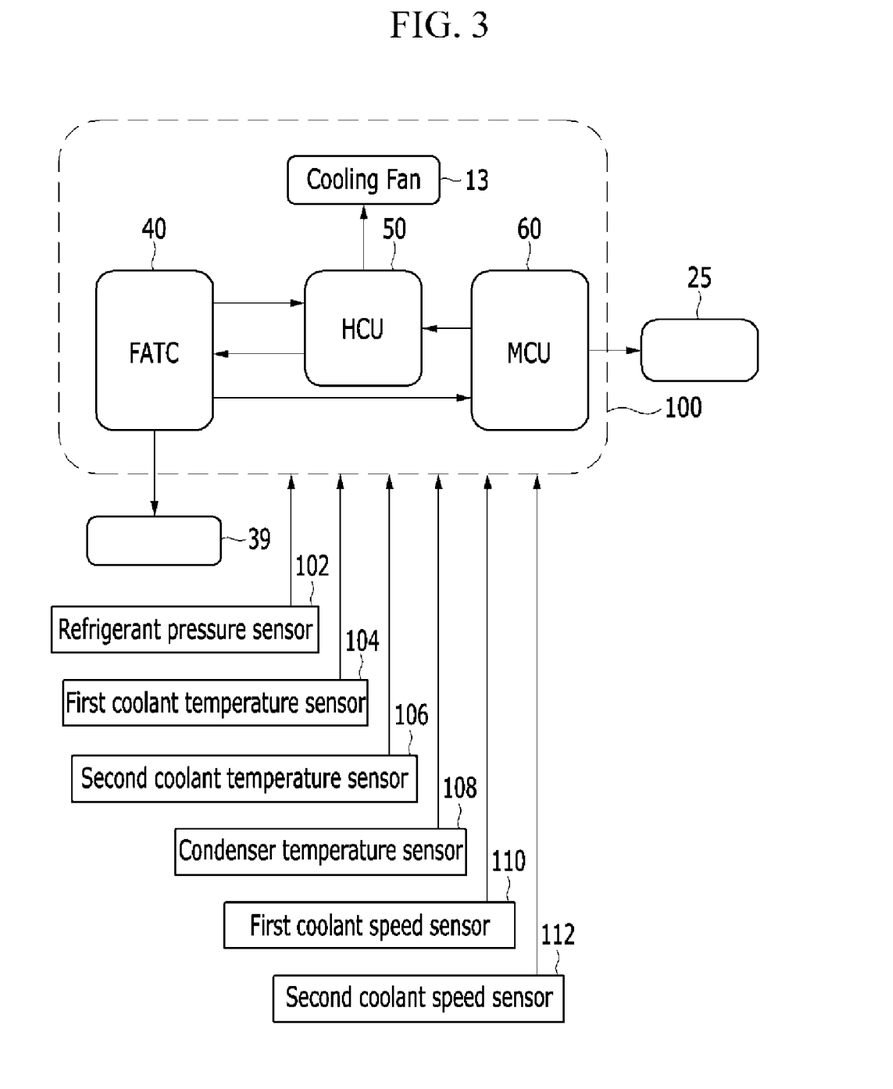
FIG. 3 is a drawing showing a controller of the exemplary integrated cooling system control method according to the present invention.

FIG. 1 is a block diagram showing an integrated cooling system of which an integrated cooling system control method according to various embodiments of the present invention is applied to, FIG. 2 is a flowchart illustrating an integrated cooling system control method according to various embodiments of the present invention, and FIG. 3 is a drawing showing a controller of an integrated cooling system control method according to various embodiments of the present invention.

Referring to the drawings, a control method for an integrated cooling system according to various embodiments of the present invention may be applied to a vehicle which includes an engine E, a drive motor M and electric devices 21 and uses driving torques of the engine E and the drive motor M.

The control method according to various embodiments of the present invention may be applied to an integrated cooling system including a cooling system 10 for an engine E, a cooling system 20 for electric devices 21 and an air conditioning system 30.

The cooling system 10 for an engine E, as shown in FIG. 1, includes the engine E, a radiator 11 for the engine E cooling coolant by heat exchange with air, a cooling fan 13 disposed behind the radiator 11 for the engine E, a thermostat valve 15 controlling flowing of the coolant and a circulating the coolant cooled at the radiator 11 for the engine E. The water pump 17 for the engine E may be a mechanical water pump.

The cooling system 20 for electric devices 21 includes the drive motor M, the electric devices 21, a radiator 23 for electric devices 21 cooling coolant by heat exchange with air and disposed front of the radiator 11 for the engine E and a water pump 25 for electric devices 21 circulating the coolant cooled at the radiator 23 for electric devices 21 to the drive motor M and the electric devices 21.

The cooling system 20 for electric devices 21 may further include a water-cooled intercooler 19 for cooling a turbo-charger provided to the engine E.

In the vehicle provided with the cooling system 10 for an engine E and the cooling system 20 for electric devices, the air conditioning system 30 includes a water-cooled condenser 31 provided within the radiator 23 for electric devices 21 for interlocked cooling refrigerant using the coolant of the cooling system 20 for electric devices 21 and an air-cooled condenser 33 disposed in front of the radiator 23 for electric devices 21 for secondly cooling the refrigerant pre-cooled in the water-cooled condenser 31.

The air conditioning system 30 further includes an expansion valve 35 for expansion of the refrigerant supplied from the air-cooled condenser 33, an evaporator 37 for evaporating the coolant supplied from the expansion valve 35, and a compressor 39 compressing the refrigerant supplied from the evaporator 37 and supplying the compressed refrigerant to the water-cooled condenser 31.

The integrated cooling system according to various embodiments of the present invention further includes a controller 100, a detecting operating stats of the integrated cooling system and outputting correspond signals to the controller 100, and the controller 100 controls operations of the evaporator 37, the water pump 25 for electric devices 21 and the cooling fan 13.

The plurality of sensors may include, for example, a refrigerant pressure sensor 102 detecting refrigerant pressure of the air conditioning system 30, a first coolant temperature sensor 104 detecting coolant temperature of the cooling system 10 for an engine E, a second coolant temperature sensor 106 detecting coolant temperature of the cooling system 20 for electric devices 21, a condenser temperature sensor 108 detecting temperature of the condensers 31 and 33, a first coolant speed sensor 110 detecting coolant speed of the cooling system 10 for an engine E, and a second coolant speed sensor 112 detecting coolant speed of the cooling system 20 for electric devices 21.

The first coolant speed sensor 110 and the second coolant speed sensor 112 may be replaced by a first coolant flow meter and a second coolant flow meter for measuring flowing rates of the each coolant.

The temperatures of the condensers 31 and 33 may be directly detected by the condenser temperature sensor 108 or indirectly predicted using the coolant temperatures or the coolant temperature and pressure and so on.

The control method according to various embodiments of the present invention may be applied to control the water pump 25 for electric devices 21 and the cooling fan 13 by interlocking operation of the air conditioning system 30 including the water-cooled condenser 31 and the air-cooled condenser 33 with the cooling system 20 for electric devices 21 according to operating conditions of a vehicle, an air conditioner, driving load and so on. The control method for the integrated cooling system of various embodiments of the present invention may minimize power consumption for operating the cooling fan 13 and the compressor 39 so that fuel and battery consumption may be reduced.

As shown in FIG. 2, (A) the controller 100 determines whether an air conditioner is operated or not after the engine E is on, (B) the refrigerant pressure sensor 102 detects air conditioner refrigerant pressure, and the controller 100 determines whether the air conditioner refrigerant pressure is within a predetermined range or not, and controls the water pump 25 for electric devices 21 and the cooling fan 13, and (C) the controller 100 determines cooling requirement of the water-cooled condenser and the air-cooled condenser 31 and 33 when the air conditioner refrigerant pressure is within the predetermined range and determines operations of the water pump 25 for electric devices 21 and the cooling fan 13.

At the stage of (A), the controller 100 determines whether an air conditioner is operated or not at step S2, and controls the operations of the water pump 25 for electric devices 21 and the cooling fan 13 according to a predetermined first map when the air conditioner is not operated (S3).

The predetermined first map may be pre-stored in the controller 100.

In various embodiments, the water pump 25 for electric devices 21 and the cooling fan 13 are a water pump and a cooling fan of which operating speeds are controllable.

The controller 100 includes a FATC (Full Auto Air Condition Temperature Controller; 40), a HCU (Hybrid Control Unit; 50) and an MCU (Motor Control Unit; 60) which are connected using Controller Area Network (CAN) communication with each other.

Operating speed of the cooling fan 13 is controlled by control signal of the HCU 50, and the water pump 25 for electric devices 21 may be an electric water pump and of which operation speed is controlled by control signal of the MCU 60.

While the cooling fan 13 is operated by the control of the HCU 60 in various embodiments of the present invention, but it is not limited thereto. The cooling fan 13 and the water pump 25 for electric devices 21 may be operated by control of an EMS (Engine Management System).

In the controlling according to the predetermined first map, the controller 100 determines whether cooling of the engine E, the driving motor M, the electric devices 21 and the intercooler 19 is required or not, and then the controller 100 controls the operations of the water pump 25 for electric devices 21 and the cooling fan 13 to be off when the cooling of the engine E, the driving motor M, the electric devices 21 and the intercooler 19 is not required.

The cooling requirements of the engine E, the driving motor M, the electric devices 21 and the intercooler 19 are determined by the controller 100 comparing the detected values of the each sensor 102, 104, 106, 108, 110 and 112 and pre-stored values.

The controller 100 operates first the water pump 25 for electric devices 21 and retards operation of the cooling fan 13 when the cooling of the engine E is not required and the cooling of the motor M, the electric devices 21 and the intercooler 19 is required.

That is, when the cooling of the engine M is not required, operation of the cooling fan 13 is retarded to reduce electrical energy to operate the cooling fan 13.

The controller 100 operates only the cooling fan 13 when the cooling of the engine E is required and the cooling of the motor M, the electric devices 21 and the intercooler 19 is not required referring to the values of the each sensor 102, 104, 106, 108, 110 and 112 so that electrical energy driving the water pump 25 for electric devices 21 may be saved.

The controller 100 operates the water pump 25 for electric devices 21 and the cooling fan 13 when the cooling of the engine E, the motor M, the electric devices 21 and the intercooler 19 is required referring to the values of the each sensor 102, 104, 106, 108, 110 and 112.

At the stage of (A), when it is determined that the air conditioner is in operation, the compressor 39 of the air conditioning system 30 is operated and refrigerant circulates to cool indoor of a vehicle. And then the refrigerant pressure sensor 102 detects the air conditioner refrigerant pressure at the step S4.

Then, the controller 100 compares the detected air conditioner refrigerant pressure and a predetermined value and determines the detected value within the predetermined range at the step S5.

The predetermined range of the air conditioner refrigerant pressure may be pre-stored in the controller 100 and, for example, the predetermined range is predetermined referring to pressure for normal operation of the air conditioner, condensing efficiency of the refrigerant and so on.

If the detected air conditioner refrigerant pressure is not predetermined range, the controller 100 controls the operation of the water pump 25 for electric devices 21 and the cooling fan 13 at the step S6.

For example, the controller 100 determines whether cooling of the engine E, the driving motor M, the electric devices 21 and the intercooler 19 is required or not, and then the controller 100 controls the operations of the water pump 25 for electric devices 21 and the cooling fan 13 to be off when the cooling of the engine E, the driving motor M, the electric devices 21 and the intercooler 19 is not required.

The controller 100 operates only the water pump 25 for electric devices 21 when the cooling of the engine E is not required and the cooling of the motor M, the electric devices 21 and the intercooler 19 is required.

The controller 100 operates only the cooling fan 13 when the cooling of the engine E is required and the cooling of the motor M, the electric devices 21 and the intercooler 19 is not required.

The controller 100 operates the water pump 25 for electric devices 21 and the cooling fan 13 when the cooling of the engine E, the motor M, the electric devices 21 and the intercooler 19 is required.

At the stage of (C), if it is determined that the detected air conditioner refrigerant pressure is within the predetermined range, the controller 100 detects temperatures of the water-cooled condenser 31 and the air-cooled condenser 33 directly or indirectly and then determines whether cooling of the water-cooled condenser 31 and the air-cooled condenser 33 is required or not at the step S7, the controller 100 stops operation or decelerating of the water pump 25 for electric devices 21 when the cooling of the condensers 30 and 33 is not required at the step S8.

The controller 100 operates first the water pump 25 for electric devices 21 and retards operation of the cooling fan 13 when the cooling of the condenser 31 and 33 is required at the step S9.

That is, if the air conditioner refrigerant pressure is within the predetermined range and each condenser 31 and 33 requires cooling, it may be determined as the air conditioner refrigerant pressure is rising. So that, the water pumps 25 for electric devices 21 are operated for circulating the coolant. With the operation of the water pumps 25 for electric devices 21, condensing efficiency of the refrigerant is improved and pressure rising of the air conditioner refrigerant pressure is retarded.

In this state, if the air conditioner refrigerant pressure is rising further, the cooling fan 13 is operated for cooled coolant to be supplied to the water-cooled condenser 25. With this operation, power consumption for the water pump 25 for electric devices 21 may be reduced.

As shown in FIG. 3, the HCU 50 controls operation speed of the cooling fan 13 and the FATC 40 controls operation of the compressor 39 under control of the HCU 50.

The FATC 40 outputs signal of required flowing rate of the coolant of the air conditioner cooling system 30 to the MCU 60 through CAN communication, the MCU 60 determines required flowing rate of the coolant of the cooling system 20 for electric devices 21, and then the MCU 60 controls the operation of the water pump 25 for electric devices 21 according to the higher value of the compared the required flowing rates.

In this case, the FATC 40 may output a requiring signal of operation of the compressor 39 to the HCU 50, and HCU 50 outputs a control signal to FATC 40 to operate the compressor 39.

Also, the HCU 50 operates the cooling fan 13 according to highest value of required operation speed referring to temperatures of the motor M and the electric devices 21, the coolant temperature and air conditioner refrigerant pressure.

In various embodiments of the present invention, the water pump 25 for electric devices 21 may be operated efficiently according to the air conditioner refrigerant pressure as well as the cooling fan 13 so that excessive rising of air conditioner refrigerant pressure may be prevented.

The control method according to various embodiments of the present invention may be applied to control the water pump 25 for electric devices 21 and the cooling fan 13 by interlocking operation of the air conditioning system 30 including the water-cooled condenser 31 and the air-cooled condenser 33 with the cooling system 20 for electric devices 21 according to operating conditions of a vehicle, an air conditioner, driving load and so on. Thus it is possible to minimize power consumption for operating the cooling fan 13 and the compressor 39 so that fuel and battery consumption may be reduced.

Also, operating time of water pump 25 for electric devices 21 and the cooling fan 13 may be reduced, and pressure rising of refrigerant of an air conditioner may be prevented and cooling performance may be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A control method for an integrated cooling system including a water-cooled condenser for an air conditioner provided within a radiator for electric devices and an air-cooled condenser for an air conditioner, the control method comprising:
    determining, by a controller, whether the air conditioner is operated or not, and controlling operations of a water pump for electric devices and a cooling fan by the controller according to a predetermined first map when the air conditioner is not operated;
    detecting, by a coolant pressure sensor, an air conditioner refrigerant pressure when the air conditioner is operated, determining, by the controller, whether the air conditioner refrigerant pressure is within a predetermined range or not, and controlling, by the controller, operations of the water pump for electric devices and the cooling fan according to a predetermined second map when the air conditioner refrigerant pressure is not within the predetermined range; and
    determining, by the controller, a cooling requirement of the condensers and controlling operations of the water pump for electric devices and the cooling fan according to the cooling requirement of the condensers when the air conditioner refrigerant pressure is within the predetermined range.

2. The control method of claim 1, wherein the controlling according to the predetermined first map includes:
    determining whether cooling of an engine, a driving motor, the electric devices and an intercooler is required or not;
    controlling operations of the water pump for electric devices and the cooling fan to be off when the cooling of the engine, the driving motor, the electric devices and the intercooler is not required;
    operating first the water pump for electric devices and retarding operation of the cooling fan when the cooling of the engine is not required and the cooling of the motor, the electric devices and the intercooler is required;
    operating only the cooling fan when the cooling of the engine is required and the cooling of the motor, the electric devices and the intercooler is not required; and
    operating the water pump for electric devices and the cooling fan when the cooling of the engine, the motor, the electric devices and the intercooler is required.

3. The control method of claim 1, wherein the controlling according to the predetermined second map includes:
    determining whether cooling of an engine, a driving motor, electric devices and an intercooler is required or not;
    controlling operations of the water pump for electric devices and the cooling fan to be off when the cooling of the engine, the driving motor, the electric devices and an intercooler is not required;
    operating only the water pump for electric devices when the cooling of the engine is not required and the cooling of the motor, the electric devices and the intercooler is required;
    operating only the cooling fan when the cooling of the engine is required and the cooling of the motor, the electric devices and the intercooler is not required; and operating the water pump for electric devices and the cooling fan when the cooling of the engine, the motor, the electric devices and the intercooler is required.

4. The control method of claim 1, further comprising:
determining, by the controller, whether cooling of the condenser is required or not when the air conditioner refrigerant pressure is within the predetermined range;
stopping operation or decelerating of the water pump for electric devices when the cooling of the condenser is not required; and
operating first the water pump for electric devices and retarding operation of the cooling fan when the cooling of the condenser is required.

5. The control method of claim 1, wherein the water pump for electric devices and the cooling fan are a water pump and a cooling fan of which operating speeds are controllable.

6. The control method of claim 1, wherein the water pump for electric devices is an electric water pump of which speed is controlled by control signal of a Motor Control Unit (MCU).

7. The control method of claim 1, wherein an operating speed of the cooling fan is controlled by control signal of a Hybrid Control Unit (HCU).

8. The control method of claim 1, wherein the controller comprises a Full Auto Air Condition Temperature Controller (FATC), an HCU and an MCU which are connected using Controller Area Network (CAN) communication with each other, wherein
the FATC outputs a required flowing rate signal of a coolant to the MCU, the MCU determines a required flowing rate of a coolant required from the vehicle driving motor and the electric devices and compares the required flowing rates, and the MCU controls the operation of the water pump according to the higher value of the compared required flowing rates.

9. The control method of claim 8, wherein the HCU controls an operation speed of the cooling fan, and the FATC controls an operation of a compressor according to controlling of the HCU.

10. A control method for an integrated cooling system including an engine cooling system having a radiator for an engine, a cooling fan and a water pump for the engine, a cooling system for electric devices having a vehicle driving motor, electric devices, an intercooler, a radiator for the electric devices and a water pump for electric devices, and an air conditioner cooling system having an expansion valve, an evaporator, a compressor, an air-cooled condenser and a water-cooled condenser provided within the radiator for the electric devices, the control method comprising:
determining, by a controller, whether the air conditioner is operated or not, and controlling an operations of the water pump for the electric devices and the cooling fan by the controller according to a predetermined first map when the air conditioner is not operated;
detecting, by a coolant pressure sensor, an air conditioner refrigerant pressure when the air conditioner is operated, determining, by the controller, whether the air conditioner refrigerant pressure is within a predetermined range or not, and controlling, by the controller, operations of the water pump for electric devices and the cooling fan according to a predetermined second map when the air conditioner refrigerant pressure is not within the predetermined range; and
determining, by the controller a cooling requirement of the condensers and controlling operations of the water pump for electric devices and the cooling fan according to the cooling requirement of the condenser when the air conditioner refrigerant pressure is within the predetermined range.

11. The control method of claim 10, wherein the controlling according to the predetermined first map comprises:
determining whether cooling of the engine, the driving motor, the electric devices and the intercooler is required or not;
controlling operations of the water pump for electric devices and the cooling fan to be off when the cooling of the engine, the driving motor, the electric devices and the intercooler is not required;
operating first the water pump for electric devices and retarding operation of the cooling fan when the cooling of the engine is not required and the cooling of the motor, the electric devices and the intercooler is required;
operating only the cooling fan when the cooling of the engine is required and the cooling of the motor, the electric devices and the intercooler is not required; and
operating the water pump for electric devices and the cooling fan when the cooling of the engine, the motor, the electric devices and the intercooler is required.

12. The control method of claim 10, wherein the controlling according to the predetermined second map includes:
determining whether cooling of the engine, the driving motor, the electric devices and the intercooler is required or not;
controlling operations of the water pump for electric devices and the cooling fan to be off when the cooling of the engine, the driving motor, the electric devices and an intercooler is not required;
operating only the water pump for electric devices when the cooling of the engine is not required and the cooling of the motor, the electric devices and the intercooler is required;
operating only the cooling fan when the cooling of the engine is required and the cooling of the motor, the electric devices and the intercooler is not required; and
operating the water pump for electric devices and the cooling fan when the cooling of the engine, the motor, the electric devices and the intercooler is required.

13. The control method of claim 10, further comprising:
determining, by the controller, whether cooling of the condenser is required or not when the air conditioner refrigerant pressure is within the predetermined range;
stopping operation or decelerating of the water pump for electric devices when the cooling of the condenser is not required; and
operating first the water pump for electric devices and retarding operation of the cooling fan when the cooling of the condenser is required.

14. The control method of claim 10, wherein the water pump for electric devices and the cooling fan are a water pump and a cooling fan of which operating speeds are controllable.

15. The control method of claim 10, wherein the water pump for electric devices is an electric water pump of which speed is controlled by control signal of an MCU.

16. The control method of claim 10, wherein an operating speed of the cooling fan is controlled by control signal of an HCU.

17. The control method of claim 10, wherein the controller comprises a FATC, an HCU and a MCU which are connected using CAN communication with each other, wherein the FATC outputs a required flowing rate signal of a coolant of the air conditioner cooling system to the MCU, the MCU determines a required flowing rate of a coolant of the cooling system for electric devices and compares the required flowing rates, and the MCU controls the operation of the water pump according to the higher value of the compared required flowing rates.

18. The control method of claim 17, wherein the HCU controls an operation speed of the cooling fan, and the FATC controls an operation of a compressor according to controlling of the HCU.

* * * * *